(12) United States Patent
Chen et al.

(10) Patent No.: US 12,242,928 B1
(45) Date of Patent: Mar. 4, 2025

(54) ARTIFICIAL INTELLIGENCE SYSTEM PROVIDING AUTOMATED DISTRIBUTED TRAINING OF MACHINE LEARNING MODELS

(71) Applicant: Amazon Technologies, Inc., Seattle, WA (US)

(72) Inventors: Xianshun Chen, Seattle, WA (US); Kai Liu, Bathell, WA (US); Nikhil Anand Navali, Seattle, WA (US); Archiman Dutta, Shoreline, WA (US)

(73) Assignee: Amazon Technologies, Inc.

( * ) Notice: Subject to any disclaimer, the term of this patent is extended or adjusted under 35 U.S.C. 154(b) by 978 days.

(21) Appl. No.: 16/824,480

(22) Filed: Mar. 19, 2020

(51) Int. Cl.
G06N 20/00 (2019.01)
G06N 5/01 (2023.01)

(52) U.S. Cl.
CPC ............... G06N 20/00 (2019.01); G06N 5/01 (2023.01)

(58) Field of Classification Search
CPC .................................. G06N 20/00; G06N 5/01
See application file for complete search history.

(56) References Cited

U.S. PATENT DOCUMENTS

| | | | |
|---|---|---|---|
| 9,633,315 | B2 | 4/2017 | Chapelle et al. |
| 10,832,174 | B1 * | 11/2020 | Chen .................. G06N 5/01 |
| 2012/0158624 | A1 * | 6/2012 | Lingenfelder .......... G06N 7/01 706/12 |
| 2016/0132787 | A1 | 5/2016 | Drevo et al. |
| 2018/0121814 | A1 | 5/2018 | Yu et al. |
| 2018/0240041 | A1 | 8/2018 | Koch et al. |
| 2018/0285759 | A1 | 10/2018 | Wood et al. |
| 2019/0019104 | A1 * | 1/2019 | Liu ........................ G06N 20/00 |
| 2019/0095756 | A1 * | 3/2019 | Agrawal ............... G06V 10/776 |
| 2019/0132255 | A1 * | 5/2019 | Martinez ................. H04L 43/20 |
| 2019/0156178 | A1 * | 5/2019 | Thornton ............... G06N 3/044 |
| 2019/0236487 | A1 | 8/2019 | Huang et al. |
| 2019/0318248 | A1 | 10/2019 | Moreira-Matias et al. |
| 2019/0370684 | A1 | 12/2019 | Gunes et al. |
| 2019/0392353 | A1 | 12/2019 | Liu et al. |
| 2020/0012935 | A1 | 1/2020 | Goodsitt et al. |
| 2020/0057963 | A1 | 2/2020 | Lekivetz et al. |
| 2020/0380378 | A1 * | 12/2020 | Moharrer ............... G06N 5/022 |
| 2021/0160247 | A1 * | 5/2021 | Gaddam ............... H04L 63/102 |

OTHER PUBLICATIONS

Unknown, "Overview-Hood documentation", https://horovod.readthedocs.io/en/latest/summary_includes.html, dated Mar. 5, 2020, pp. 1-11.
Unknown, "What is Azure HDInsight", dated Mar. 5, 2020, pp. 1-10.
Unknown, "What is Dataproc", dated Mar. 5, 2020, pp. 1-3.
Unknown, "Amazon EMR Management Guide", Copyright 2020 Amazon Web Services, Inc. and/or its affiliates, pp. 1-395.

* cited by examiner

Primary Examiner — Abdullah Al Kawsar
Assistant Examiner — Tewodros E Mengistu
(74) Attorney, Agent, or Firm — Robert C. Kowert; Kowert, Hood, Munyon, Rankin & Goetzel, P.C.

(57) ABSTRACT

Multiple distinct control descriptors, each specifying an algorithm and values of one or more parameters of the algorithm, are created. A plurality of tuples, each indicating a respective record of a data set and a respective descriptor, are generated. The tuples are distributed among a plurality of compute resources such that the number of distinct descriptors indicated in the tuples received at a given resource is below a threshold. The algorithm is executed in accordance with the descriptors' parameters at individual compute resources.

19 Claims, 10 Drawing Sheets

Compare results/metrics obtained from model versions which were trained in accordance with a set S1 of DTCDs, assess available resources and determine that additional training experiments are to be performed  501

Identify variant candidate source subset VC of S1, e.g., which resulted in model versions with better results than other DTCDs of S1  504

Generate variants of VC DTCDs, e.g., using techniques such as random perturbation/mutation of selected DTCD elements while retaining the remaining DTCD elements, cross-over of sub-groups of DTCD elements, etc.  507

Perform distributed training (e.g., implementing techniques illustrated in FIG 3. and FIG. 4) using generated variant DTCDs  510

FIG. 5

ARTIFICIAL INTELLIGENCE SYSTEM PROVIDING AUTOMATED DISTRIBUTED TRAINING OF MACHINE LEARNING MODELS

BACKGROUND

In recent years, more and more raw data that can potentially be utilized for solving complex analytics problems is being collected from a large variety of sources, such as sensors of various kinds including medical equipment, e-retail catalog entries, web server logs, social media services, financial transaction records, security cameras, and the like. A variety of analytics techniques, including machine learning, statistics, graph theory and the like can be combined to create algorithms that can solve problems in various domains such as natural language processing, financial fraud detection, image analysis, human health diagnosis and the like.

For some types of machine learning models, the amount of training data needed to generate a model providing a desired quality of predictions or inference can be quite large. In recent years, for example, deep neural network based machine learning models have become increasingly popular, and such models often require very large training data sets with hundreds or thousands of data records, which in some cases cannot fit into the memory of servers to be used for training the models.

In addition to the problem of dealing with requirements for large training data sets, the number of distinct hyper-parameters or configuration settings (such as the maximum tree depth for a tree-based machine learning model, or the number of hidden layers of a neural network) for which optimum or near-optimum values have to be identified for machine learning models can also be quite large. Respective experiments which each require processing of the entire training data set may be needed for each combination of hyper-parameter values. The quality of the results obtained from machine learning algorithms may vary substantially based depending on how well the hyper-parameter settings have been tuned, and how well the training data has captured important properties of the problem domain for which the models are to be deployed. In many cases, in order to be effectively deployed, machine learning models may have to be trained (or re-trained using newly-available training data) within relatively short periods, which further complicates the task of the teams responsible for the models.

BRIEF DESCRIPTION OF DRAWINGS

FIG. 5 is a flow diagram illustrating aspects of operations which may be performed to implement adaptive distributed training of machine learning models using automatically-generated variants of training control descriptors, according to at least some embodiments.

Figure 1:
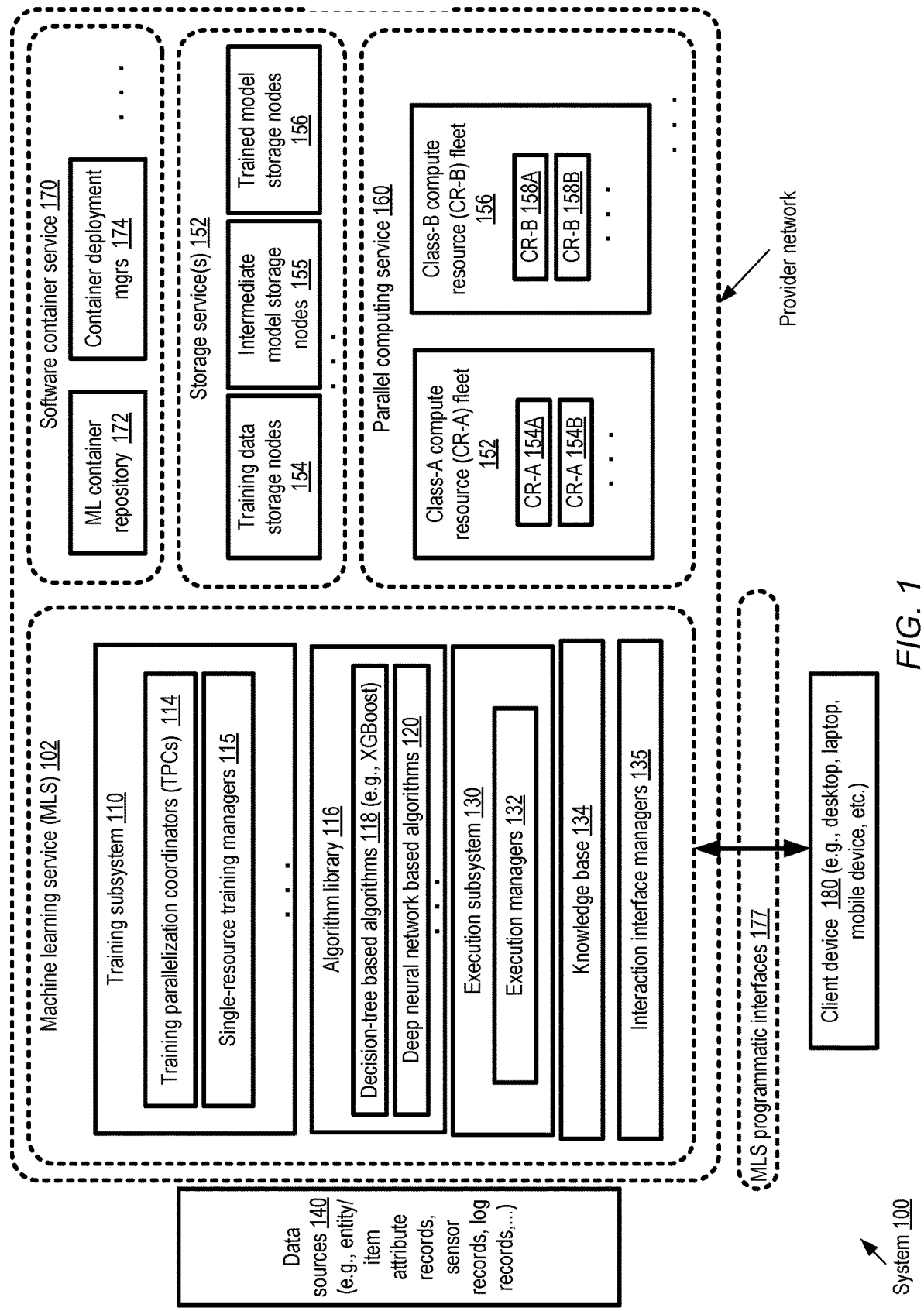
FIG. 1 illustrates an example system environment in which automated distributed training of machine learning models may be performed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for automated distributed training of machine learning models for which large amounts of training data is required and for which optimal or near-optimal combinations of numerous hyper-parameter values (as well as combinations of other factors such as the subset of input features used for training the models) have to be identified. Such distributed training may be orchestrated with the help of a network-accessible machine learning service of a provider network or cloud computing environment and a fleet of distributed/parallel computing resources in various embodiments; in some cases, the fleet may also be managed by a network-accessible service. The automation techniques described involve aspects of both data parallelism (in which operations on different subsets of a training data set may be performed in parallel at multiple resources) as well as model parallelism (in which computations associated with training several different model versions may be performed in parallel), without requiring the data scientists or other individuals responsible for the machine learning models to have to manage details regarding exactly how the parallel training tasks are to be defined and implemented.

According to at least some embodiments, a set of distributed training control descriptors (DTCDs) may be automatically generated for a machine learning training task to be performed with the help of a collection of computing resources (e.g., respective nodes of a computing service and/or a storage service), with each DTCD providing guidelines regarding the set of training-related operations which is to be performed at a given computing resource. The high-level training task for which multiple sub-tasks may be automatically identified and executed using the DTCDs may, for example, comprise identifying the best-performing model and associated hyper-parameter combination for predictions/inferences of a particular type within a particular target time period. A given DTCD may indicate, for example, a training algorithm to be used, a specific combination of hyper-parameters to be tried, one or more pre-processing operations to be performed on training data, a specific combination of features to be analyzed in the training, and so on in different embodiments. The DTCDs may be combined (e.g., using the logical equivalent of a join operation) with individual training records of a training data set to form a collection of training tuples in at least some embodiments. The training tuples may be sorted and grouped together using unique identifiers assigned to individual DTCDs in some embodiments, and then individual groups of training tuples may be transmitted automatically to respective computing resources. At the computing resources, the operations indicated in the DTCDs of the received groups may be performed. In at least some embodiments, respective batch identifiers may be assigned to the records, and the batch identifiers may be used to perform incremental or iterative training of model versions for one batch of records at a time. The sizes of the batches (i.e., the number of training records which constitute the training data set for a given version of the model) may be selected based at least in part on the memory constraints of the available computing resources in some embodiments, so that each of the computing resources is able to conduct the tasks indicated in a received DTCD on a batch of records at a time without running out of memory. In some embodiments in which such batching is used, a new version of a given model, corresponding to a particular batch b, may be generated by starting with a previous version of the model corresponding to batch (b−1), and improving the previous model version using the current batch of training data.

As one skilled in the art will appreciate in light of this disclosure, certain embodiments may be capable of achieving various advantages, including some or all of the following: (a) reducing the overall amount of time required for obtaining high-quality versions of machine learning models, (b) enhancing the user experience of clients interacting with machine learning services at which models are trained, e.g., by orchestrating large numbers of training experiments without requiring detailed guidance regarding individual experiments, and/or (c) reducing the amount of computations which may have to be re-performed if individual resources run out of memory, by automatically subdividing down the work of training models with very large data sets into smaller per-batch sub-tasks.

According to at least some embodiments, a system may comprise one or more computing devices, e.g., at a network-accessible machine learning service implemented as part of a provider network or cloud computing environment. The computing devices may include instructions that when executed on or across one or more processors cause the devices to identify a collection of compute resources for a machine learning training task, such as a task of training a machine learning model within a specified target timeframe. An indication of the overall training data set (which may be distributed across multiple storage devices or storage nodes of a service) to be used for the task may also be obtained in at least some embodiments. The computing devices may generate a plurality of distinct distributed training control descriptors (DTCDs) in various embodiments for the training task; individual ones of the DTCDs may, for example, indicate at least a training algorithm and respective values of one or more hyper-parameters of the training algorithm. Other elements stored within the DTCDs may, for example, include pre-processing steps to be performed on training data records, a combination of input features to be considered in the training (which may be a subset of the complete list of possible features which could be considered), metrics to be collected with respect to the training algorithm, and so on. Each DTCD may differ in at least one element from all the other DTCDs in some embodiments, and respective unique descriptor identifiers may be assigned to each of the DTCDs.

In at least some embodiments, one or more batch sizes may be identified for performing the training task iteratively, e.g., on one batch at a time, representing a subset of the overall collection of training data records available. Respective batch identifiers may be assigned to the records of the training data set—e.g., records 0-99,999 of a million-record training data set may be assigned batch identifier 0, records 100,000-199,999 of a million-record training data set may be assigned batch identifier 1, and so on. In some implementations, the batch identifiers may be stored with the records—e.g., an attribute "batch-ID" may be added to the set of attributes stored for each record.

A plurality of training tuples (TTs) may be generated in various embodiments by combining the training data set records and the DTCDs. In some embodiments, a cross-product of the training records and the DTCDs may be generated: e.g., if there are 1,000,000 training records and 256 DTCDs, a total of 256,000,000 TTs may be generated, with each TT indicating a given record (using a record identifier and/or a batch identifier) and a given DTCD (using the DTCD's identifier). Using the TTs, in at least some embodiments, a plurality of batch training iterations may be performed.

A given batch training iteration may comprise the following operations in some embodiments. A batch identifier for the current batch iteration may be determined, e.g., by incrementing the previous iteration's batch identifier in embodiments in which integers are used as batch identifiers. A subset S of the collection of TTs, to whose records the batch identifier was assigned, may be identified. Using at least the DTCD identifiers indicated in the TTs, the subset S of the TTs may be distributed among a plurality of the available compute resources of the collection, such that the number of distinct TCTDs of the TTs distributed to an individual computing resource is no greater than a threshold. For example, if the threshold is set to one, each computing resource may receive a group of TTs which all share the same DTCD. DTCD-count-per-resource thresholds other than one may be used in some embodiments.

Using the received set of TTs, at least one new version of a machine learning model may be trained at each compute resource in at least some embodiments, based on the guidance provided by the corresponding DTCD. Input used to generate a new version of the model with respect to a given DTCD may include, for example, (a) the training records indicated in the received set of TTs and (b) a previous version of the model, which was also trained using the same DTCD during a previous batch training iteration. If the DTCD indicates pre-processing operations, such operations may be performed prior to generating the new version of the model in various embodiments. If the DTCD indicates a particular subset of input features to be used as training input, only those features may be used for the training, and other features may be excluded in at least some embodiments. If the DTCD indicates a set of metrics to be obtained with respect to the training, the specified metrics may be obtained at the compute resource and/or transmitted to one or more destinations. The older version of the model may be obtained from a specified storage node or device of a fleet of such nodes/devices in some embodiments, and the newly-trained version of the model may be stored/written to such a node in at least some embodiment from the compute resource. Individual ones of the compute resources may be assigned respective storage nodes for storing their partially-trained versions of one or more models in some embodiments. After the final batch iteration is completed, the trained versions of the models obtained for the final batch of training data may be stored at a repository in various embodiments. Results obtained using the trained versions of the models corresponding to different DTCDs may be provided and/or compared in some embodiments, e.g., to identify the best-performing model among the models generated at the different compute resources.

Note that in some cases, the overall training data set may be small enough that training operations involving the entire training data set may be performed within a single compute resource, in which case the batching technique indicated above may not be required. In effect, in such scenarios, only a single batch iteration of the kind discussed above may be needed. DTCDs and TTs similar to those used in the batch training methodology may still be generated and propagated in such scenarios, but batch-based filtering of training data may not be needed, and per-batch versions of models may not have to be stored and used as input for new versions.

Distributed implementation of a variety of training algorithms may be implemented using the techniques described above in various embodiments. For example, distributed training for decision-tree based algorithms such as XGBoost may be implemented, or neural network based models may be trained using the described combination of data parallelism and model parallelism. In some embodiments, a similar approach towards automated parallelization of related tasks involving analysis of data may be implemented for other types of problems, which may not necessarily involve machine learning.

According to some embodiments, as mentioned above, the distributed training technique introduced above may be performed using one or more services (e.g., including a machine learning service or a parallel computing service) of a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment (or simply as a "cloud"), which indicates a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of at least some services of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network, etc.).

A machine learning service of a provider network may implement a set of programmatic interfaces in various embodiments, such as a web-based console, a set of application programming interfaces (APIs), graphical user interfaces, command-line tools and so on. Such interfaces may be used by clients to submit requests for high-level training tasks in various embodiments, and the service may automatically identify sub-tasks from the high-level task, obtain information about available compute resources (including memory sizes, which may be used to determine batch sizes), create and propagate DTCDs to compute resources, and obtain results of the distributed training in some embodiments. In some embodiments, a client may use such programmatic interfaces to indicate a desired range of one or more hyper-parameters, and the DTCDs may be constructed based on such ranges (e.g., by subdividing the ranges into sub-ranges automatically, generating different hyper-parameter combinations based on the sub-ranges, and so on).

In at least some embodiments, adaptive distributed training may be implemented at a machine learning service. In such an adaptive approach, the results obtained from a first set of DTCDs may be analyzed, and a few DTCDs which led to the best results may be identified as the basis for an additional round of experimentation. The selected better-performing DTCDs may be used as the sources to generate new DTCD variants, in which for example small perturbations or mutations are applied to individual elements of the source DTCDs, keeping other elements unchanged. In some cases, the variant DTVDs may be generated by simply copying over some elements of some of the more-successful DTCDs into other DTCDs. The variant DTCDs may then be deployed using the parallel training approach described above, to determine if even better results can be obtained; further iterations of such adaptive training may be implemented if resource and/or time constraints have not been exhausted.

In some embodiments, automated distributed training experiments or tasks of the kind introduced above may be implemented without acquiring resources of network-accessible services of a provider network. For example, a stand-alone tool implemented at one or more computing devices which are not part of a network-accessible service may be used in some embodiments to generate DTCDs and coordinate the distribution of training operations across multiple resources.

Example System Environment

FIG. 1 illustrates an example system environment in which automated distributed training of machine learning models may be performed, according to at least some embodiments. As shown, system 100 comprises resources and artifacts of a plurality of network-accessible services of a provider network 101, including a machine learning service 102, a parallel computing service 160, one or more storage services 152, and a software container service 170. The provider network 101 may include numerous other services in some embodiments, which are not shown in FIG. 1, including for example a virtualized computing service, a database service, and so on. Some services may be layered on top of other services in the depicted embodiment; that is, components of a given service may utilize components of other services. For example, a set of software containers generated for machine learning tasks by training and evaluation managers 112 of the machine learning service may be stored in a container repository 172 of the software container service, machine learning artifacts (such as trained or partially trained models) produced on behalf of the training managers 112 may be stored at storage services 152, and so on. Individual ones of the services of the provider network 101 may implement a respective set of programmatic interfaces (such as MLS programmatic interfaces 177) which can be used by external and/or internal clients (where the internal clients may comprise components of other services) in some embodiments. The MLS 102 may also be referred to as an artificial intelligence service or an artificial intelligence system in various embodiments.

In at least some embodiments, the MLS 102 may comprise a training subsystem 110, an algorithm library 116, an execution subsystem 130, a knowledge base 134, and a set of interaction interface managers 135. MLS programmatic interfaces 177 may include, for example, one or more web-based consoles, APIs, command-line tools, graphical user interfaces and the like which can be used by MLS clients to submit machine learning related programmatic requests or messages from client devices 180 (e.g., desktops, laptops, mobile devices and the like). Using interfaces 177, a client may for example request that a machine learning model training task, involving the use of a specified training set and requiring experimentation with respect to various properties of one or more machine learning algorithms (such as the particular algorithms to be used, hyper-parameter values, feature processing alternatives, and the like) be performed on the client's behalf. The details of the specific experiments to be performed, whether and how the training data is to be subdivided for analysis, and so on, need not be provided by the client in such requests in the depicted embodiment; instead, such details may be worked out within the MLS, e.g., at the training subsystem 110. Such client-submitted requests may be received and processed initially at one or more interaction interface managers 135, which may parse the requests, generate corresponding internal requests and transmit the internal requests to other subcomponents of the MLS 102 to cause the requested tasks to be performed.

Depending on the kind of problem which is to be solved using machine learning, raw records from which the training data set for one or more models is to be constructed may be available from a variety of data sources 140. Such data sources may, for example, include a collection of records representing entities for which similarity analysis is to be performed, sensor-generated records from which trends regarding environmental condition are to be inferred, log records which are to be analyzed for anomalous behaviors, and so on. Indicators of the specific data sources to be used for a machine learning training task may be provided by an MLS client in some embodiments, e.g., as part of a training request submitted via an interface 177.

In at least one embodiment, a client may indicate a set of compute resources which can be used for the machine learning training task to be orchestrated by the MLS, e.g., in the training task request or in a separate communication via programmatic interfaces 177. In some embodiments, a collection of compute resources of a parallel computing service 160 may be indicated by the client. Such resources may have already been allocated to the client prior to the submission of the training task request in some cases. In other cases, one or more training parallelization coordinators (TPCs) 114 of the MLS 102 may determine a proposed collection of resources required for the sub-tasks of the client's task, and inform the client regarding the proposed collection. The client may then acquire the proposed collection and inform the MLS 102 regarding the acquired collection of resources, or approve the automated acquisition of the proposed collection of compute resources by the MLS 102 on behalf of the client. A parallel computing service 160 may comprise several different categories or classes of compute resources in some embodiments, which may differ from one another in such properties as computing capacity, memory capacity, network bandwidth capacity, the type of hardware processors used, and so on. For example, in the depicted embodiment, the parallel computing service 160 may comprise several different fleets of compute resources, such as Class-A compute resource fleet 152, Class-B compute resource fleet 156, and so on. Depending on the specific type of machine learning tasks which have to be performed, and/or the set of available resources allocated to or acquired by the client, a collection of compute resources comprising instances of more than one class of resource may be used for a given machine learning task in some embodiments. In one such embodiment, a pool of resources available for a distributed training task may include one or more Class-A compute resources such as 154A and 154B, as well as one or more Class-B compute resources 158A and 158B. The MLS 102 may distribute the training workload based on the performance capabilities of the available compute resources in various embodiments: e.g., more of the workload may be distributed to a Class-A resource 154 than is distributed to a Class-B resource. In some embodiments, the parallel computing service 160 may support features similar to those of the Apache Spark™ framework.

In some cases, the raw training data to be used for a set of training experiments to be performed on behalf of a client may be transferred to one or more training data storage nodes 154 of a storage service 152, e.g., by a TPC 114 or by the client. If the data is too large to be accommodated at a single storage service node 154, it may be spread over multiple such nodes.

A TPC 114, which may comprise some combination of hardware and software at one or more computing devices in various embodiments, may automatically generate a collection of distributed training control descriptors (DTCDs) for a given training task request received from an MLS client. The contents of a given DTCD may indicate, for example, a particular machine learning algorithm to be used to train a model, a set of hyper-parameter values, one or more pre-processing steps to be performed on training data, input feature subsets to be used for the training (versus other features which can be ignored), metrics to be collected from the training algorithm, where (e.g., at which nodes of a storage service 152) previous versions of a model (if any are needed) should be obtained, where new versions of a model obtained via the training are to be stored, and so on in different embodiments. Any of a number of different machine learning algorithms of MLS algorithm library 116 may be specified in the DTCDs in different embodiments, including for example decision-tree based algorithms 118 such as XGBoost, deep neural network based algorithms 120, and so on. In some embodiments, at least a subset of the elements of the DTCDs may be generated by a TPC using a knowledge base 134 of the MLS 102. For example, a client may simply specify one or more algorithms such as XGBoost, and the TPC 114 may automatically (a) determine a list of hyper-parameters for the algorithm, (b) determine reasonable ranges for one or more hyper-parameters of the list, and (c) create combinations of reasonable hyper-parameter values for inclusion in the DTCDs.

In effect, a DTCD may provide sufficient information about how at least one version of a model should be trained to enable a compute resource to execute the training in at least some embodiments. Individual ones of the DTCDs may be assigned respective unique identifiers in the depicted embodiment by a TPC. In some embodiments, the set of DTCDs generated automatically by a TPC 114 in response to a single client-submitted request may indicate more than one training algorithm—e.g., some DTCDs may indicate that a first algorithm Alg1 is to be used for training, other DTCDs may indicate that a second algorithm Alg2 is to be used, and so on. In at least some embodiments, a TPC may cause a number of different software containers to be generated and stored, e.g., at a repository 172 of software container service 170, with each container comprising an executable program implementing the algorithm indicated in a DTCD. The software containers may later be deployed to compute resources for implementing the training, e.g., in response to programmatic requests sent by a TPC 114 to a container deployment manager 174.

In some embodiments, the size of the data set to be used for a collection of training experiments performed in response to a client request may be too large to be processed at a given compute resource to be used to run the experiments, and a batch training approach may be used. In the batch training approach, a batch size may be determined at a TPC for a given set of training experiments, e.g., based on information about the memory capacities of available compute resources, as well as information about individual training record sizes or the sizes of features generated from the training records. If the training data set comprises $10^7$ records in all, the size of an individual record is $10^5$ bytes, and the memory capacity of individual compute resources (assumed to be the same for all compute resources for the purposes of this example) which can be dedicated to machine learning data is $10^{10}$ bytes, then the number of records that can be processed at a time at a given resource is $(10^{10}/10^5)=10^5$, so a batch size of $10^5$ records may be chosen. The $10^7$ records of the training data set may be subdivided into 100 batches, each comprising $10^5$ records, and training at a given compute resource may be performed on no more than one batch at a time, with a total of 100 batch iterations being performed to complete examining the training entire data set.

In an embodiment in which batch training is used, records of the training data set may each be assigned a respective batch identifier selected from a plurality of batch identifiers (e.g., identifiers 1-100 in the above example in which 100 batches are created). Thus, if there are 10∂total records, 100 batches each comprising 10000 records may be created. In some embodiments, batch identifiers may be assigned randomly to the records of the data set; in other embodiments, non-randomized techniques may be used to assign batch identifiers. The batch identifiers may be added, e.g., as an extra attribute or field, to the records in some implementations.

Using the DTCDs and the records of the training data set (which may contain batch identifiers), in various embodiments a plurality of training tuples (TTs) may be generated by one or more TPCs 114. A given tuple may combine a record with a DTCD. In some cases, the equivalent of a cross-product or Cartesian join may be performed on the set of DTCDs and the set of records to obtain the TTs: e.g., the number of tuples may be equal to the product of (a) the number of records of the training data set and (b) the number of TCTDs generated for the client's requested training task. The TPCs 114 may then initiate a plurality of batch training iterations in various embodiments, terminating the iterations when all the batches of records have been processed with respect to all the TCTDs, or when a resource consumption threshold associated with the client's request has been reached.

In a given batch iteration, a subset of the TTs whose records were assigned a batch identifier corresponding to the iteration may be identified in the depicted embodiment. A grouping operation based on DTCD identifiers may be performed on the TTs e.g., all the TTs whose records have the batch identifier of the iteration, and share the same DTCD identifier, may be combined into a group of TTs which is sent to a given compute resource. The TTs may be sent to respective compute nodes, e.g., by the TPCs, such that the number of distinct control descriptors of the TTs distributed to an individual compute resource is no greater than a threshold (such as one). In effect, each compute resource may be provided (a) an indication of a batch of training records and (b) guidance (in the form of a DTCD) as to how training should be performed on that batch to generate a new version of a model. The operations indicated in the DTCD (which may include prep-processing of the training records, feature inclusion/exclusion, as well as the training algorithm to be used) may then be performed at the compute resource, resulting in the new version. In at least some batch iterations, a previously-generated version of a model (using the same DTCD but a different batch of training records), stored for example at an intermediate model storage node 155 of a storage service, may serve as the starting point for the training at a compute resource. The previous version of the model may be improved or enhanced using the current batch of training data in such embodiments. The new version of the model obtained at the compute resources may be stored, e.g., at the same storage node 155 or a different storage node 155 that was used for the previous version in the depicted embodiment. After the batch iterations have been terminated, the final versions of the models (produced in the last batch iteration) may be stored in various embodiments, e.g., at trained model storage nodes 156 of the storage service 152.

The results obtained using the different DTCDs may be compared in some embodiments, e.g., by the TPCs 114, to determine one or a few best-performing DTCDs (that is, DTCDs which led to the most accurate predictions or inferences). If and when a client wishes to obtain predictions from a trained version of a model, a prediction request may be submitted via the programmatic interfaces 177. In response to such a prediction request, a trained version of a model (e.g., one of the versions which performed best) may be run by an execution manager 132 of an execution subsystem 130 of the MLS 102, and the prediction result may be provided to the requester or to a destination specified by the requester. The training subsystem 110 may also include single-resource training managers 115 in some embodiments, which can be used to respond to training requests which do not require the use of, or would not benefit from the use of, multiple compute resources in parallel.

In some embodiments, software containers may be used as the units of training capacity. For example, if a TOC determines that one of the compute resources available (such as a Class-A compute resource 154) has twice the performance capacity of another (such as a Class-B compute resource 158), twice as many software containers may be deployed (along with respective sets of TTs for each container) to the higher-performance-capacity compute resource than are deployed to the lower-performance-capacity compute resource.

Example Training Coordinators and Control Descriptors

Figure 2:
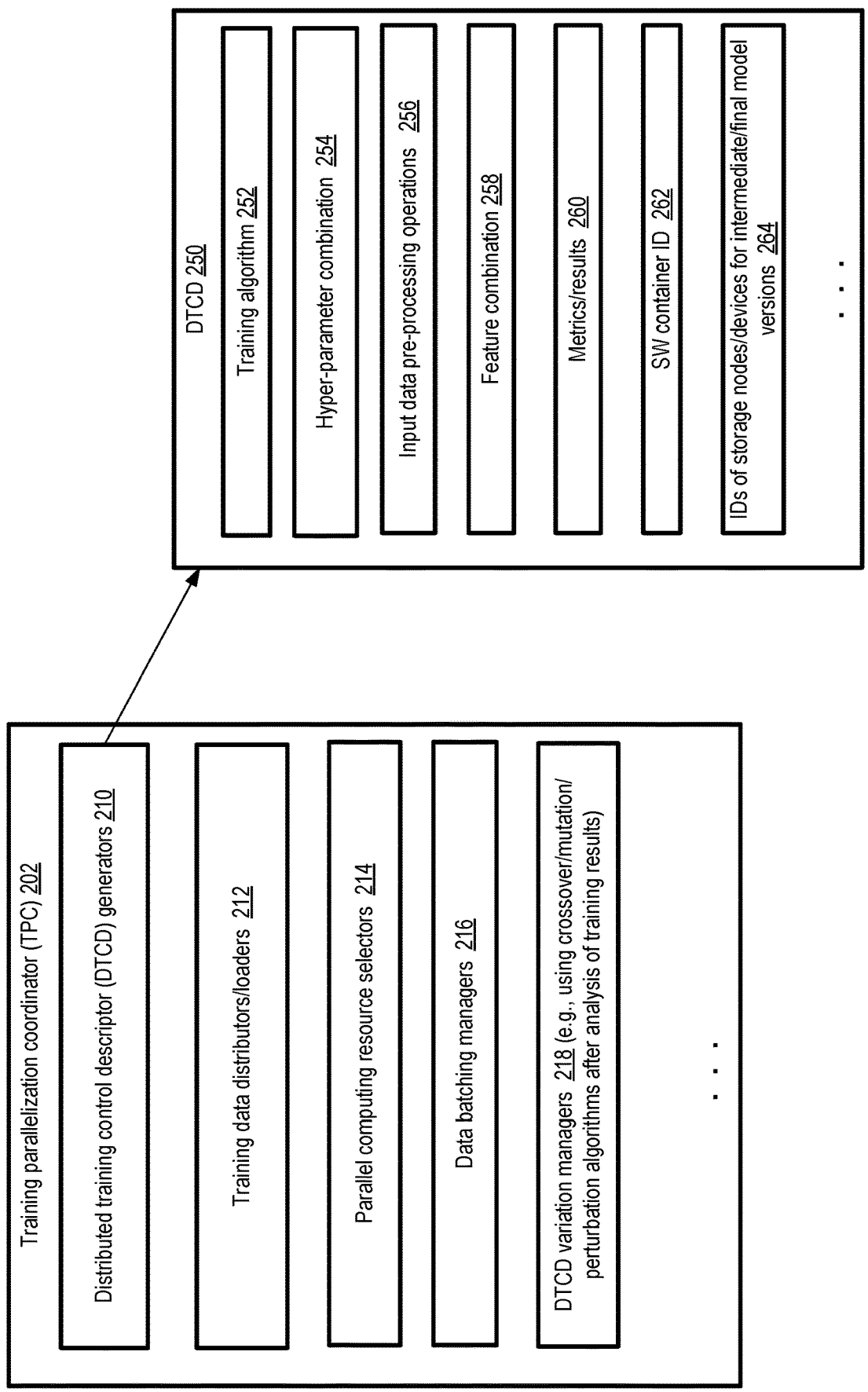
FIG. 2 illustrates example components of machine learning training coordinators and elements of training control descriptors generated by such coordinators, according to at least some embodiments.

FIG. 2 illustrates example components of machine learning training coordinators and elements of training control descriptors generated by such coordinators, according to at least some embodiments. In the depicted embodiment, a training parallelization coordinator (TPC) 202 of a machine learning service similar to MLS 102 of FIG. 1 may comprise one or more DTCD generators 210, one or more training/evaluation data distributors/loaders 212, one or more parallel compute resource selectors 214, one or more data batching managers 216, and one or more adaptive DCTD variation managers 218.

A DTCD generator 210 may be responsible for creating a set of DTCDs 250 in response to obtaining an indication of a high-level training task, received for example via a programmatic interface of an MLS in the depicted embodiment. A given DTCD may include one or more of the following elements in the depicted embodiment: an indication of a training algorithm 252 to be used to train new versions of one or more models in the depicted embodiment, a combination 254 of hyper-parameter values, a list of input data pre-processing operations to be performed on training records before proceeding with the training, an indication of a feature combination 258 of the training records to be used as input for the training, a list of one or more metrics/results 260 to be obtained from the training of the new versions of the models and provided to one or more destinations, a software container identifier 262, and/or identifiers 264 of storage nodes or devices to be used for intermediate or final model versions.

The training algorithm 252 may be specified by name in some embodiments, and the name may be used to extract an executable version of the algorithm from an algorithm library of the MLS. In some implementations, a pointer to an executable version of the algorithm (e.g., a byte-code version) may be provided in the DTCD 250, and/or the actual source code or object code for the algorithm may be included in the DTCD 250. Hyper-parameter combinations 254 may for example include numeric values, and/or non-numeric values selected from a set of permissible categorical values, for a set of hyper-parameters of the algorithm.

Input data pre-processing operations 256 may include parsing raw records, normalizing/standardizing the record fields or attributes (e.g., by converting text to lower or upper case, removing punctuation, etc.), converting text or other non-numeric attributes to numerical vectors or matrices, and so on in different embodiments. Feature combination information 258 may indicate that some attributes or derived features of attributes are to be retained in the training data for the set of experiments performed in accordance with the DTCD 250, while others are not to excluded or discarded.

Depending on the particular training algorithm specified in a DTCD 250, different combinations of results or metrics 260 may be collected from the execution of the algorithm—e.g., in some cases, model data structure-dependent metrics such as the number of tree paths/nodes traversed may be collected, in other cases resource utilization metrics may be collected, and so on. In some embodiments, as mentioned earlier, respective software containers may be prepared corresponding to individual DTCDs, e.g., in response to respective requests directed from a TOC 202 to a software container service similar to service 170 of FIG. 1. Each such container may include the code and metadata (e.g., hyper-parameter files, library files, etc.) needed to train a model version in accordance with the DTCD. The container ID 262 may be used to deploy the container to a computing resource for execution in at least some embodiments. In at least one embodiment, identifiers 264 of storage nodes or storage devices of a storage service at which the per-batch partially-trained versions of the model corresponding to the DTCD 250 are to be stored, and/or the final versions are to be stored, may be included in the DTCD. A DTCD may comprise other elements than those shown in FIG. 2 in some embodiments.

For at least some training tasks, the MLS may have to distribute the training data among a set of storage nodes and/or storage devices, and then load subsets of the records into the memories of compute resources. Such tasks may be handled by one or more training data distributors/loaders 212 in the depicted embodiments. In some scenarios, a heterogeneous collection of compute resources may be available for training machine learning models, and a parallel computing resource selector 214 may be responsible for identifying the particular subset of available compute resources which are to be used, or for determining that all available resources are to be used. Factors taken into consideration when selecting the resources may include, among others, the memory sizes of the compute resources, network proximity to the storage nodes at which the data is stored and/or the repository at which the relevant software containers are stored, the degree to which the resources differ in compute capacity (which can affect how closely in time various training iterations can be expected to be completed), and so on. Data batching managers 216 may be responsible for determining appropriate batch sizes and/or assigning batch identifiers to individual data records in the depicted embodiment. In at least some embodiments, adaptive variants of previously-generated DTCDs may be created by one or more DTCD variation managers 218 of a TPC 202. Techniques such as crossover, mutation and random perturbation may be used by the variation managers 218 to generate variants of DTCDs which have already proven to be somewhat successful in producing high-quality models, but for which additional exploration of DTCD parameters is desired, as discussed below in further detail below with respect to FIG. 5. TPCs 202 may include other components in some embodiments than those shown in FIG. 2.

Methods for Automated Distributed Training

Figure 3:
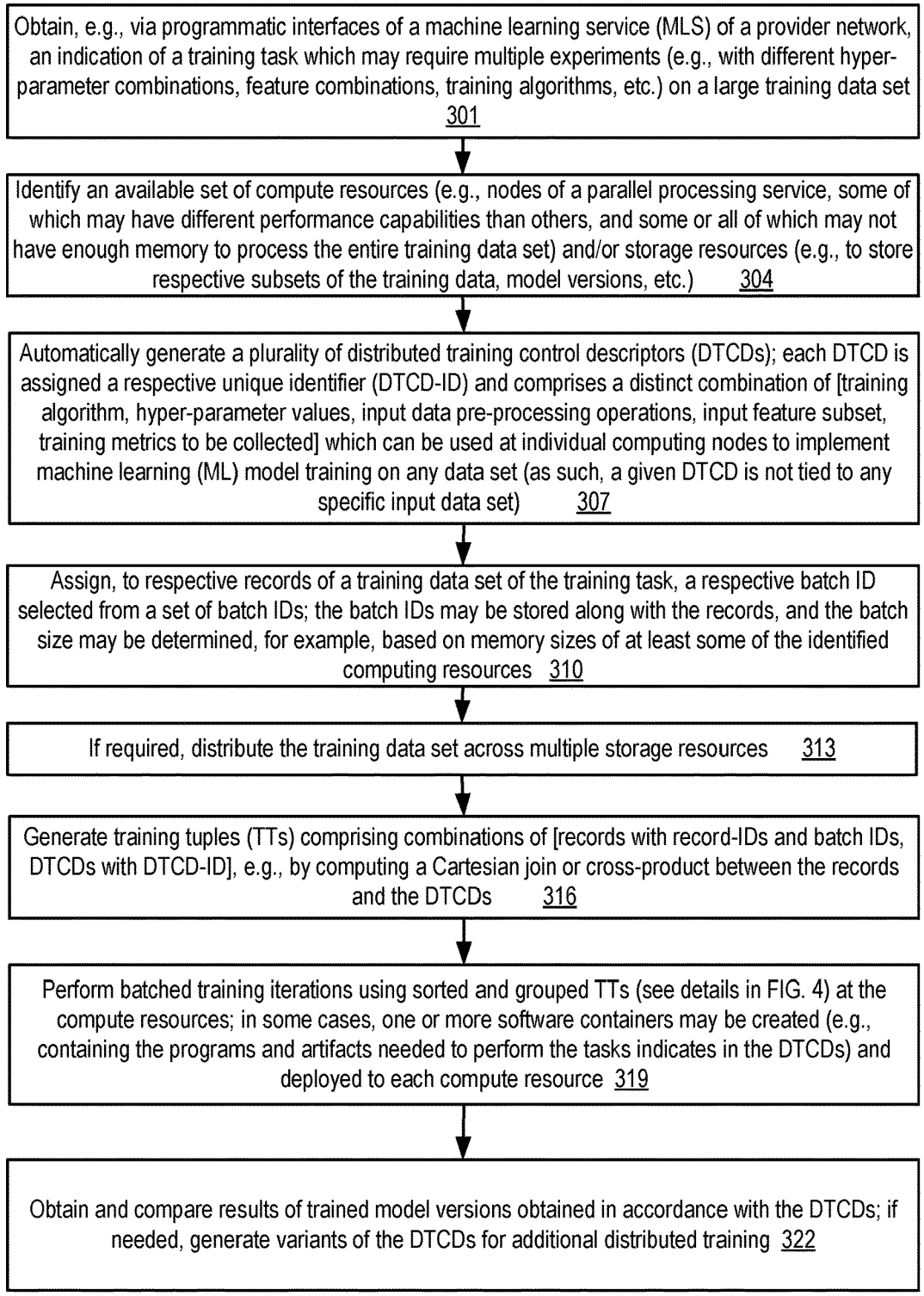
FIG. 3 is a flow diagram illustrating aspects of operations which may be performed to implement a requested distributed training task for machine learning, according to at least some embodiments.

FIG. 3 is a flow diagram illustrating aspects of operations which may be performed to implement a requested distributed training task for machine learning, according to at least some embodiments. As shown in element 301, an indication of a training task which may require multiple experiments (e.g., with respective sets of hyper-parameters or feature combinations, different training algorithms, etc.) on a large data set (e.g., a data set containing hundreds of thousands, or millions, of records, with each record comprising values of one or more attributes/fields) may be obtained, e.g., at a machine learning service (MLS) of a provider network, similar in features to MLS 102 of FIG. 1. The indication of the training task may be obtained in the form of one or more requests transmitted via programmatic interfaces of the MLS by an MLS client in at least some embodiments.

An available set of compute resources to be used for the training task may be identified (element 304), e.g., by one or more training parallelization coordinators (TPCs) similar to the TPCs 114 discussed in the context of FIG. 1 in the depicted embodiment. The compute resources may, for example, comprise respective nodes of a parallel computing service of a provider network in some embodiments, with each node in turn comprising one or more physical or virtual machines. Some compute resources of the identified set may differ from the others in characteristics such as memory size, processor count or processor speed, and so on in at least one embodiments; the compute resources need not be homogeneous. At least some compute resources may not have enough memory to be able to process or hold the entire training data set at the same time in some embodiments. A set of available storage resources (e.g., nodes or devices of a storage service of a provider network) may be identified as well in some embodiments, e.g., to store respective subsets of the training data, intermediate and final versions of the models which are to be trained, model results, and so on.

A plurality of distributed training control descriptors (DTCDs) may be generated for the training task in various embodiments (element 307), e.g., by the TPCs. Each DTCD may be assigned a respective unique identifier (which can for example be used as a lookup key for group-by operations or searches). A given DTCD may comprise a combination of some or all of the following elements in some embodiments: an indicator of a training algorithm, a combination of hyper-parameter values to be used for training, one or more data pre-processing operations (which may be used to generate input features for models from the records of the training data), an indication of a feature combination (e.g., a subset of the available features) to be used for the training of one or more models, and/or metrics to be collected with respect to the training of the one or more models. A given DTCD may provide enough information for a version of a machine learning model to be trained at a compute resource using any training data set; as such, none of the DTCDs may be tied to, or restricted to use with respect to, any given data set in at least some embodiments.

In the embodiment depicted in FIG. 3, a respective batch identifier may be assigned to each record of the data set, based for example on a batch size determined using information about the memory sizes of the compute resources (element 310). In at least one implementation, the batch size may be selected such that all of the data records which are assigned the same batch number can fit within the memory of the compute resource which has the smallest amount of memory among the identified compute resources, so as to avoid out-of-memory errors at any of the compute resources. In some embodiments, batch identifiers may be stored along with the records (e.g., by adding an extra "batch ID" field or attribute to the records). If required (e.g., if the entire training data set cannot fit on a single storage node or resource), the training data set may be distributed among multiple storage resources identified for the training task in the depicted embodiment (element 313).

A plurality of training tuples (TTs) may be generated, e.g., by the TPCs, from the DTCDs and the records of the data set in various embodiments (element 316). Each TPC may comprise a training data record (which may have a record identifier as well as a batch identifier) and a DTCD. In at least some implementations, the TTs may be obtained by performing a Cartesian join or cross-product between the records of the training data and the DTCDs; thus if there were R records and D DTCDs in all, a total of (RxD) TTs may be generated.

Figure 4:
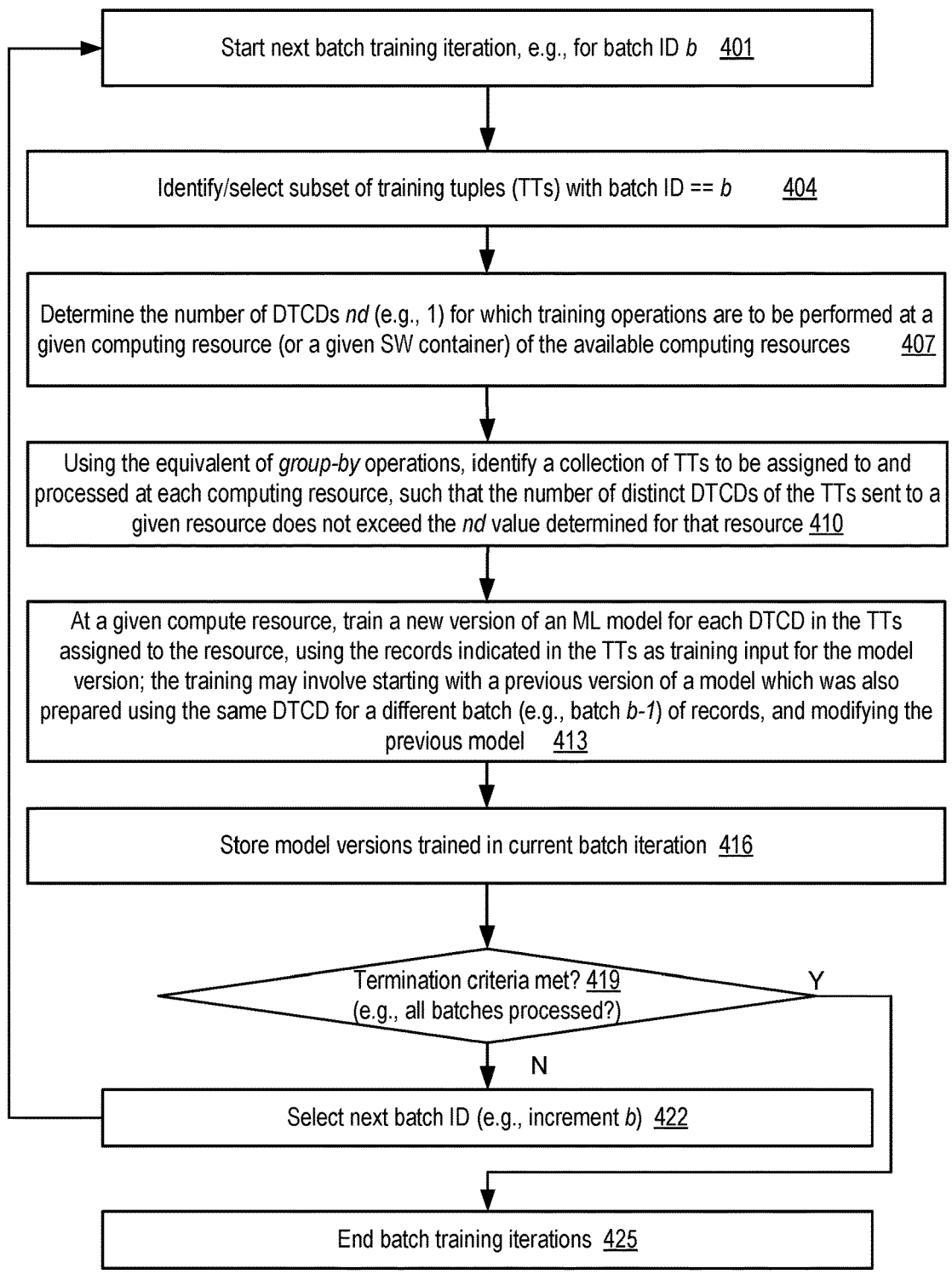
FIG. 4 is a flow diagram illustrating aspects of operations which may be performed to implement batched training of machine learning models using a group of computing resources, according to at least some embodiments.

Using the TTs, a plurality of batch training iterations may be conducted at the identified compute resources in various embodiments (element 319); details of such iterations are provided in FIG. 4. In some embodiments, respective software containers may be generated, e.g., for each DTCD, and deployed to the compute resources at which TTs of that DTCD are sent. Such software containers may comprise programs and artifacts needed to perform the training tasks indicated in the DTCD. In one embodiment, if a given compute resource has sufficient capacity to implement training operations corresponding to multiple DTCDs, multiple software containers may be deployed and run at the compute resources, one container for each DTCD.

Results/metrics obtained from the trained model versions (e.g., the versions produced in the final batch iterations using the respective DTCDs) may be obtained and compared in various embodiments (element 322), e.g., to identify a subset of DTCDs which led to the predictions/inferences of the highest quality among the DTCDs which were used. In some embodiments, variants of such DCTDs may be generated, as discussed below in further detail in the context of FIG. 5, and used for further experimentation intended to identify even better model versions. The trained models with the best results may also be executed (e.g., at the execution subsystem of the MLS, similar to subsystem 130 of FIG. 1) to provide responses to client requests for predictions/inferences in various embodiments.

FIG. 4 is a flow diagram illustrating aspects of operations which may be performed to implement batched training of machine learning models using a group of computing resources, according to at least some embodiments. In at least some embodiments, as mentioned above, individual records of a training data set may be assigned batch identifiers (e.g., integers from 1 to max-batch-size), with the total number of batches being determined based on factors such as the number of training records which can be accommodated for training operations within a compute resource's memory. Instead of performing training on the entire data set in accordance with the information provided in a given DTCD, training may be performed iteratively, one batch at a time for each DTCD at a given compute resource in some embodiments.

A batch training iteration for a batch identifier b may be begun in operations corresponding to element 401 of FIG. 1. A subset of training tuples (TTs) of the kind generated in operations corresponding to element 316 of FIG. 3, whose records have been assigned batch identifier b may be selected or identified (element 404), e.g., by a TPC of the kind discussed earlier using a query with the batch identifier b as a query parameter.

The number of distinct DTCDs and for which training operations are to be performed at a given compute resource of the available compute resources (or at a given software container, in embodiments in which software containers are used) may be identified (element 407), e.g., also by a TPC. In one simple implementation, nd may be set to one: that is, only a single DTCD may be used for training at a given compute resource. Other values of nd may be used in other implementations. In some implementations, different values of nd may be identified for different compute resources, e.g., if the compute resources' performance and/or memory capabilities differ from one another.

Using the logical equivalent of a group-by operation (e.g., similar to group-by operations supported in Structured Query Language (SQL)), a collection of TTs to be assigned to and processed at individual ones of the compute resources or software containers may be identified in various embodiments (element 410). The TTs may be assigned to compute resources in such a way in the depicted embodiment that the number of distinct DTCDs of the TTs sent to a given resource does not exceed the nd value chosen for that resource.

At a given compute resource, a new version of a machine learning model may then be trained for each distinct DTCD in the TTs assigned to that resource (element 413). In the simple scenario in which only one DTCD is represented in the TTs sent to a resource, one version of the model may be trained at the resource, for example. The records in the TTs for that DTCD may be used as input for the training. In at least some embodiments, an earlier (partially trained) version of the model corresponding to a given DTCD may be used as the starting point—e.g., the training records of batch b may in effect be used to improve the model generated using batch (b−1) and earlier batches, resulting in a modified version of the model for batch b.

The model version(s) (one per DTCD) generated in the iteration for batch b may be stored (element 416). If termination criteria for the batch iterations are satisfied (as determined in operations corresponding to element 419), e.g., if all batches of the training data have been processed, or if a resource limit for the training task has been reached, the batch training iterations may be ended (element 425). Otherwise, the batch identifier for the next iteration may be selected (e.g., by incrementing b), and operations corresponding to elements 401 onwards may be repeated for the next iteration in the depicted embodiment.

FIG. 5 is a flow diagram illustrating aspects of operations which may be performed to implement adaptive distributed training of machine learning models using automatically-generated variants of training control descriptors, according to at least some embodiments. The results/metrics obtained from model versions trained according to the elements of a set Si of DCTDs may be compared with one another (element 501), e.g., at a TPC of the kind discussed earlier. Availability of resources for additional distributed training iterations may be verified in at least some embodiments. Based, for example, on the potential for further improvements in the models and the availability of sufficient resources, a decision to conduct further experiments may be made.

From among the DTCDs of Si, for which training experiments have already been conducted, a variant candidate source subset VC may be identified (element 504). VC may comprise, for example, K DTCDs (out of L DTCDs of Si, with K<=L) which resulted in higher quality models, e.g., as determined using the metrics/results comparisons. The specific metrics used to distinguish model quality may of course vary with the models. The intuition behind identifying variant candidates may be stated in this way: if models with a quality level>Q1 have been identified within a set VC of DCTDs, and sufficient resources and time is available to conduct further training experiments, it may be worthwhile to modify the DTCDs of VC slightly and conduct additional experiments to see if even higher quality models (e.g., with quality>(Q1+delta)) can be obtained. The DTCDs of VC may be termed variant source DTCDs in some embodiments, as they are the sources from which variants are generated.

A number of different techniques may be employed to generate variants of the DTCDs of the candidates identified in different embodiments (element 507). Some elements of the DTCDs may be modified using small random perturbations or mutations, a few elements of some of the candidate DTCDs may be copied ("crossed over") to other candidate DTCDs (replacing the corresponding existing elements), and so on. Such techniques may be considered analogous to the kinds of natural variations observed in biology/genetics.

Distributed training iterations similar to those discussed in the context of FIG. 3 and FIG. 4 may be performed with the newly-generated variant DTCDs (element 510), and the results obtained may be compared with those obtained earlier with the unmodified DTCDs of VC. If desired, the process of identifying the best-performing subset of DTCDs, generating variants of such DTCDs, and conducting additional distributed training iterations with such variants, may be repeated multiple times in some embodiments.

Training Tuple Creation and Distribution Example

Figure 6:
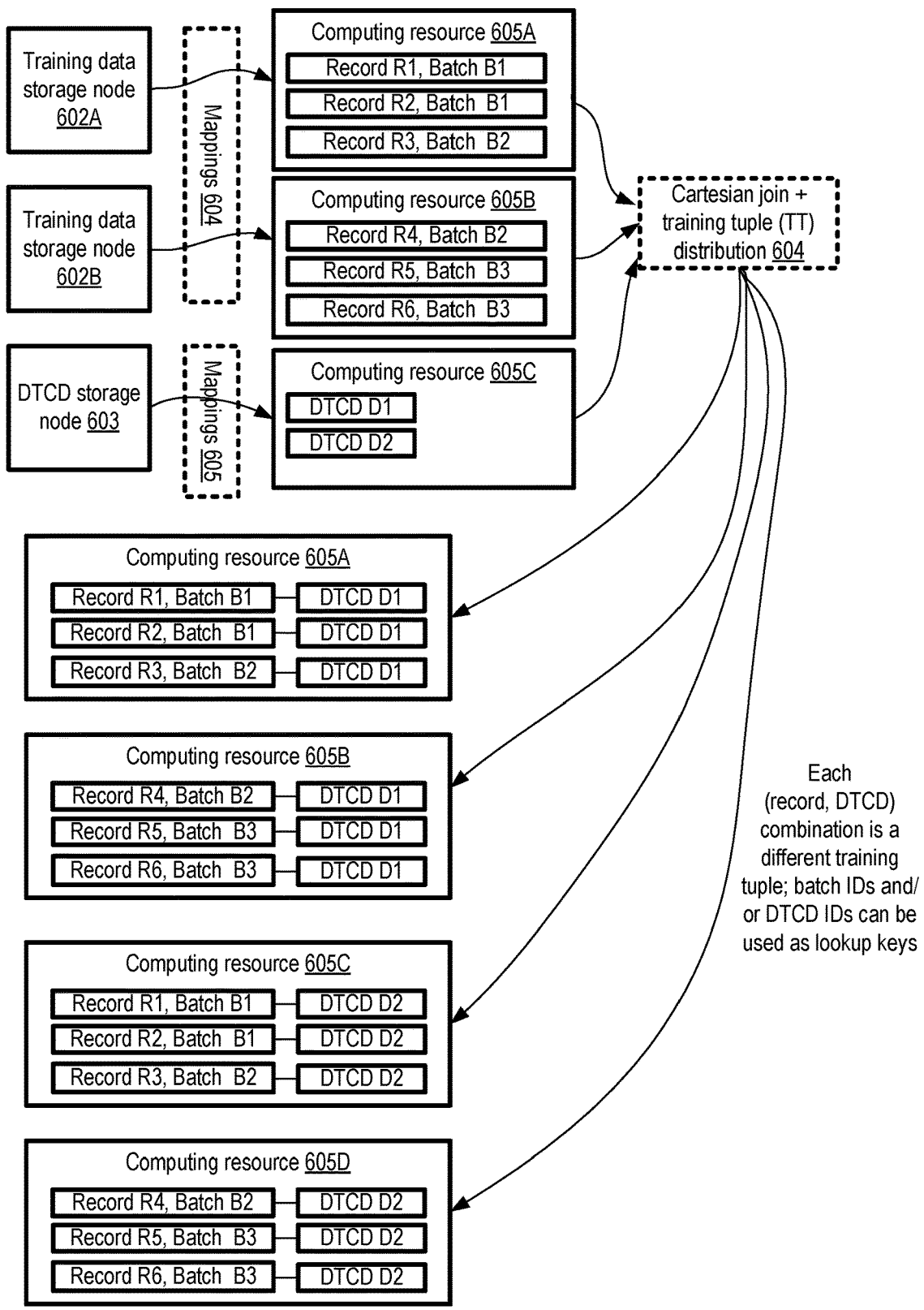
FIG. 6 illustrates an example creation of training tuples for distributed training of machine learning models, according to at least some embodiments.

FIG. 6 illustrates an example creation of training tuples for distributed training of machine learning models, according to at least some embodiments. A very small number of training data records and DTCDs are shown in the examples shown in FIG. 6 and FIG. 7 to help present the concepts underlying the automated distributed training methodology; in practice, the numbers of training data records and/or DTCDs would be much higher. Note that the automated distributed training techniques introduced above may be applied in various embodiments independently of the total number/size of training records available, and independently of the total number/size of DTCDs.

In the example scenario shown in FIG. 6, a training data set comprising size records R1-R6 is stored across two storage nodes 602A and 602B. The training data set is divided into three batches with respective batch identifiers B1, B2 and B3, and read into the memories (or written to the memories) at two computing resources 605A and 605B. One or more mapping functions 604 may be used to select the computing resource to which a particular training record is directed in the depicted embodiment. The logic of the mapping functions may be determined in at least some embodiments at a training parallelization coordinator (TPC) of the kind introduced earlier; the mapping functions may be executed at the storage nodes 602, the computing resources 605, the TPC, and/or at some other component in different embodiments. Records R1 and R2 are placed in batch B1, R3 and R4 are placed in batch B2, and records R5 and R6 are placed in batch B3. Two DTCDs with respective identifiers D1 and D2 are generated and stored at storage node 603, e.g., by the TPC. The DTCDs are loaded into the memories of a different computing resource 605B via mappings 605. In the depicted embodiment, the set of DTCDs may be created in advance of the initiation of training iterations, and stored at persistent storage after being assigned respective unique identifiers which can later be used as lookup keys; in other embodiments, DTCDs may be created/re-created dynamically during the iterative training procedure and/or stored at non-persistent storage.

A Cartesian join operation may be performed on the training records and the DTCDs to obtain a plurality of training tuples (TTs) in the depicted embodiment, and the training tuples may be distributed among four computing resources, as indicated in element 604. Note that the TTs may not all have to be generated before any of them are distributed in the depicted embodiment—instead, individual TTs may be distributed as soon as they are generated, thus avoiding having to store all the TTs in one centralized memory or persistent storage device. Each TT comprises a combination of one record and one DTCD, which can be looked up using batch IDs and/or DTCD IDs as keys. Twelve TTs are generated from the six records and two DTCDs; each record is thus combined separately with each of the DTCDs to form a TT. In the depicted distribution of TTs, computing resources 605A-605D are each sent three TTs: for example, TTs representing (record, DTCD) combinations (R1, D1), (R2, D1) and (R3, D1) are sent to computing resource 605A, TTs representing combinations (R4, D1), (R5, D1) and (R6, D1) are sent to computing resource 605B, and so on. As shown, the some of the same computing resources into which the training records and/or the DTCDs were loaded may be re-used to store the TTs in some embodiments; in other embodiments, different computing resources may be selected for the TTs than those into which the training records or DTCDs were initially loaded. The next steps of the automatically parallelized training technique are illustrated in FIG. 7 for the same data set and DTCD combination which are shown in FIG. 6.

Figure 7:
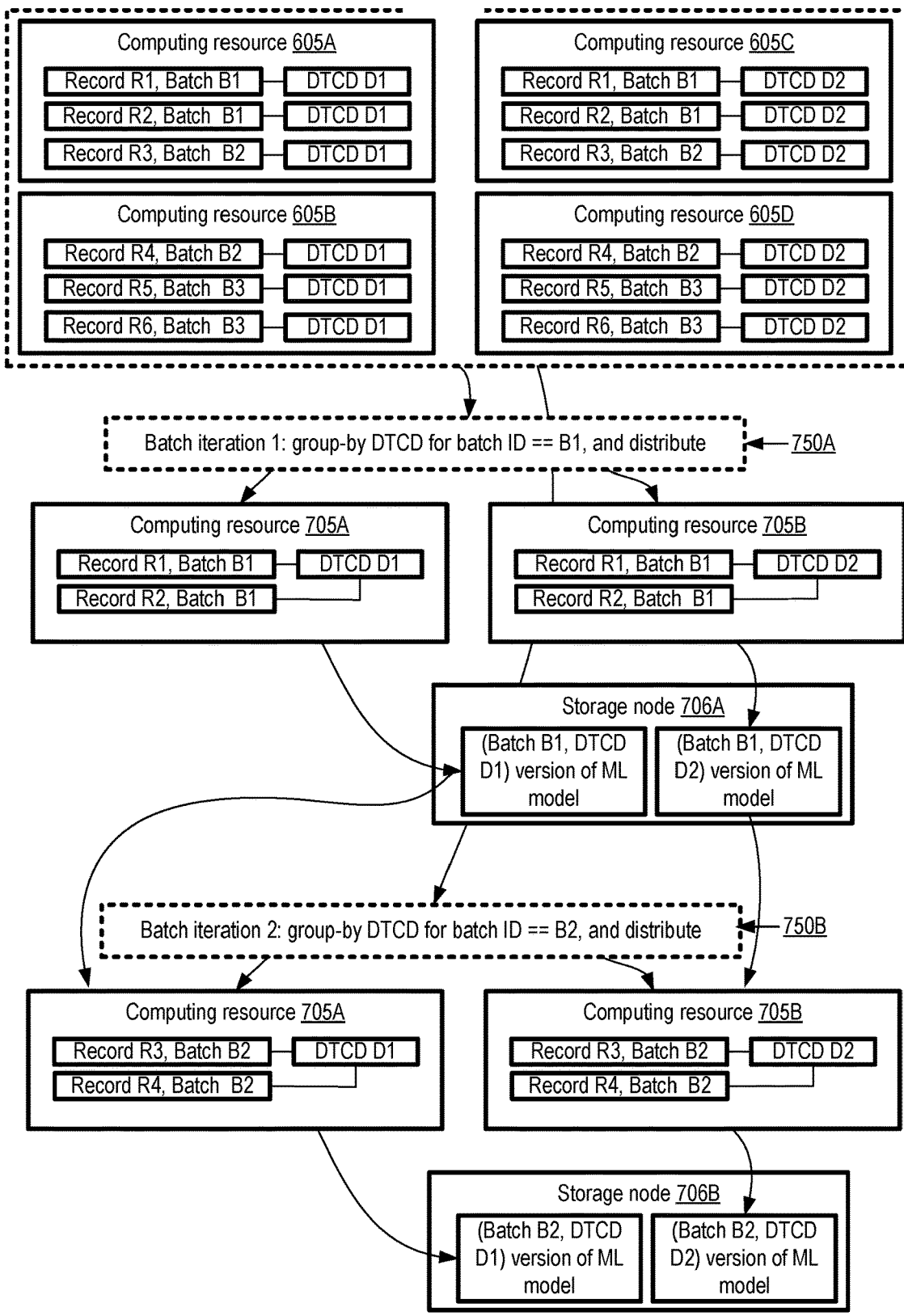
FIG. 7 illustrates example assignments of training tuples to computing resource for batched training of machine learning models, according to at least some embodiments.

FIG. 7 illustrates example assignments of training tuples to computing resource for batched training of machine learning models, according to at least some embodiments. The twelve TTs which were generated and stored in FIG. 6 are used to produce several different versions of a machine learning model in the depicted embodiment, working on one batch of training records at a time. For batch iteration 1, the logical equivalent of a group-by operation is orchestrated on the TTs, e.g., by a TPC, and the resulting groups of records for a single DTCD and batch B1 are sent to each of two computing resources 705A and 705B, as indicated in element 750A of FIG. 7. (In some implementations, one or more of the resources 705A and 705B may comprise some of the same resources at which the TTs were stored—e.g., 705A may be the same physical or virtualized server as 605A, and so on.)

Computing resource 705A receives records of batch B1 grouped by DTCD D1 in the depicted example scenario, and trains a (B1, D1) version of a machine learning model in accordance with the guidelines/requirements indicated in DRCD D1. This version of the model is stored at a storage node 706A after it is trained. Note that in practice, depending on the particular training algorithm being used, batching may also be implemented at another granularity during the training of a given model version: for example, mini-batches may be obtained from batch B1 and used to implement a gradient descent based algorithm for the (B1, D1) version. Such mini-batches (which may be as small as 32 or 64 records in some cases) may be used, for example, to inject a reasonable amount of noise for gradient updates while still enabling fast convergence of the gradient descent algorithm; in contrast, the batch training iterations described herein may be used in various embodiments to avoid out-of-memory errors at the compute resources, not for gradient-descent-related concerns.

Computing resource 705B receives records of batch B1 grouped by DTCD D2 in the depicted example scenario, and trains a (B1, D2) version of the machine learning model in accordance with the guidelines/requirements indicated in DTCD D2. This version of the model is also stored at a storage node 706A after it is trained in the depicted scenario. In some embodiments the trained models for a given batch may not all be stored at the same storage node.

Having obtained and stored the B1 versions of the model, improved versions of the model may next be generated using batch B2 of the training records. As shown in element 750B, another group-by operation (this time on TTs containing batch B2 records) is performed, and the per-group DTCDs are again sent to computing resources 705A and 705B. At each computing resource, the previous batch's output model version (for the same DTCD) is used as part of the input for training, along with the training records of the batch. Thus, for example, the input for the (B2, D1) version of the model at resource 705A comprises the (B1, D1) version as well as the records R3 and R4. Similarly, the (B1, D2) version of the model may be used to generate the (B2, D2) version of the model at resource 705B. The new versions of the model, generated for batch B2, are stored at a storage node 706B in the depicted embodiment. Operations analogous to those performed for the B2 versions of the model may be performed next for the iteration for batch B3: e.g., a group-by and distribute operation may be implemented for Tts containing B3 records, and newer versions of the models may be generated using the stored B2 versions.

In various embodiments, TPCs may be responsible for the coordination of operations similar to those illustrated in FIG. 6 and FIG. 7 on behalf of a client of a machine learning service. The client may not, for example, have to make decisions about how training data and DTCDs are mapped to storage nodes or computing resources, how DTCDs are generated, how batches are assigned, how TTs are generated and to which resources which TTs are sent, where batch-level model versions are stored, and so on; such decisions may be made automatically. In at least some embodiments, the TPCs may also be able to select/obtain replacement computing resources if a given computing resource fails or becomes unresponsive, and cause the operations which were assigned earlier to the filed resource to be re-performed at the replacement resource.

Example Sequential Training Using Subsets of Hyper-Parameters

Figure 8:
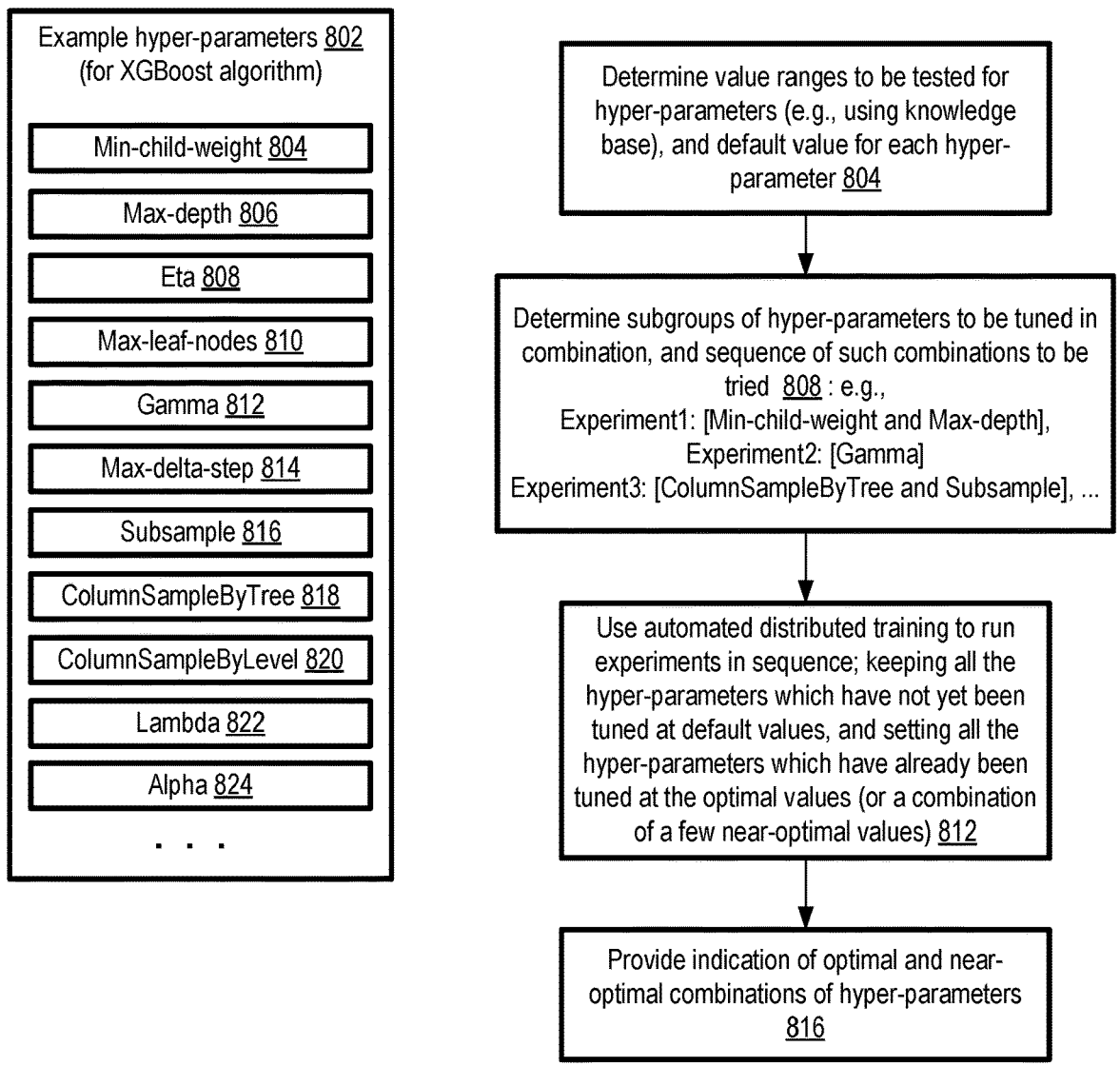
FIG. 8 illustrates an example technique in which experiments on respective subsets of a large collection of hyper-parameters may be performed in an ordered automated sequence, according to at least some embodiments.

The DTCDs used to orchestrate training experiments may in at least some embodiments be used to identify optimal, or at least superior, combinations of hyper-parameter values. The total number of hyper-parameter combinations to be tried may be extremely large for some sophisticated machine learning algorithms. FIG. 8 illustrates an example technique in which experiments on respective subsets of a large collection of hyper-parameters may be performed in an ordered automated sequence, according to at least some embodiments. The technique illustrated in FIG. 8 may keep a substantial subset of hyper-parameters fixed for a given round of training experiments, thus reducing the total number of experiments which have to be performed; however, the number of experiments run for each subset of hyper-parameters may still be large enough to benefit from the DTCD-based technique illustrated earlier.

Example hyper-parameters 802 of a popular machine learning algorithm called XGBoost are shown in FIG. 8. XGBoost is an implementation of gradient boosted decision trees, used for a wide variety of problems such as similarity analysis, classification, and ranking on structured data records. Hyper-parameter min-child-weight 804 indicates the minimum sum of instance weights needed in a child to continue a particular phase of the algorithm. Max-depth 806 indicates the maximum permitted tree depth. Eta 808 governs the step size shrinkage used to prevent overfitting. Max-leaf-nodes 810 indicates the limit on the number of nodes to be added. Gamma 812 is the minimum loss reduction required to make a further partition on a leaf node of a tree. Max-delta-step 814 indicates the maximum delta allowed in leaf outputs. Subsample 816 is the ratio of training instances to be sampled prior to growing trees. ColumnSampleByTree 818 is the subsample ratio of columns of the training data records when constructing a tree, and ColumnSampleByLevel 820 is the subsample ratio of columns for each level of the tree. Lambda 822 is an L2 regularization setting, and alpha 824 is an L1 regularization setting. Other hyper-parameters may also have to be tuned for XGBoost in some embodiments, in addition to or instead of those shown in FIG. 8.

As shown in element 804, value ranges to be tested for various hyper-parameters of an algorithm such as XGBoost may be determined at a machine learning service similar to MLS 102 of FIG. 1, e.g., based on knowledge base entries in some embodiments. Default values for individual hyper-parameters may also be determined; such default values may be assigned to some hyper-parameters before experiments to determine superior values are conducted.

The MLS may determine subgroups of hyper-parameters to be tuned in combination (element 808), and the sequence in which experiments with respect to the sub-groups are to be conducted. For example, for XGBoost, a first experiment involving automated distributed training may focus on the combination of hyper-parameters Min-child-weight and max-depth, a second experiment may focus on gamma, a third experiment may focus on ColumnSampleByTree and Subsample, and so on. In some embodiments, the combinations and/or sequence may be determined based on a knowledge base, while in other embodiments, random combinations and/or random sequencing may be used.

As shown in element 812, automated distributed training may be used to run experiments in the selected sequence, with DTCDs being automatically generated for each combination of hyper-parameters. The best performing hyper-parameter combination values (or a few combinations which perform better than others) may be identified from the results of each experiment. In a given experiment, default values may be used for those hyper-parameters for which experiments have not yet been run, while optimal values may be used for those hyper-parameters for which experiments have already been conducted (if any). Using the sequence of hyper-parameter tuning experiments, optimal or near-optimal combinations of values for all hyper-parameters of interest may eventually be determined in the depicted embodiment (element 816).

It is noted that in various embodiments, some of the operations shown in the flow diagrams of FIG. 3, FIG. 4, FIG. 5, and/or FIG. 8 may be implemented in a different order than that shown in the figure, or may be performed in parallel rather than sequentially. Additionally, some of the operations shown in the flow diagrams of FIG. 3, FIG. 4, FIG. 5, and/or FIG. 8 may not be required in one or more implementations.

Example Programmatic Interactions

Figure 9:
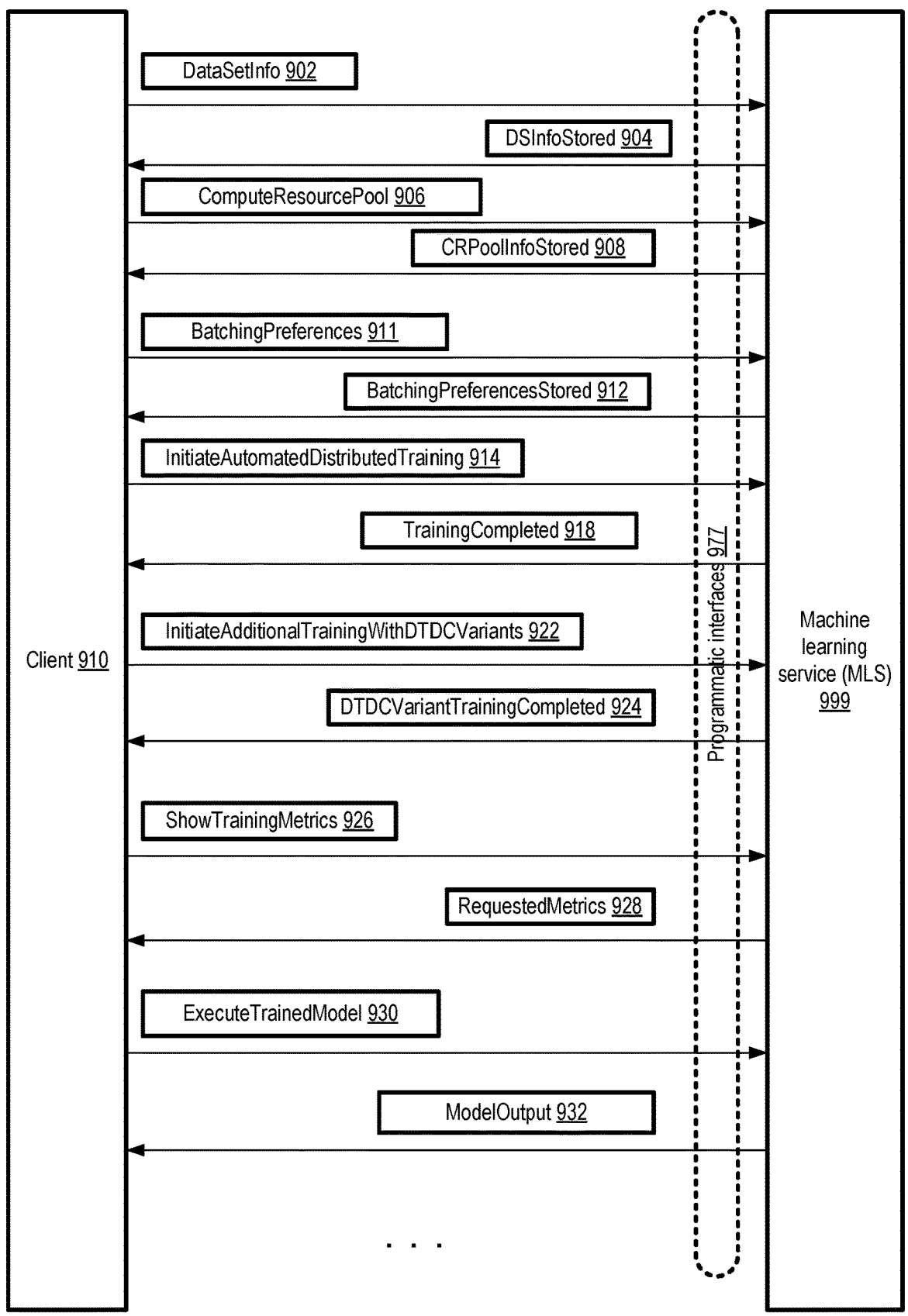
FIG. 9 illustrates example programmatic interactions between a client and a machine learning service, according to at least some embodiments.

FIG. 9 illustrates example programmatic interactions between a client and a machine learning service, according to at least some embodiments. A machine learning service 999, similar in features and functionality to MLS 102 of FIG. 1, may implement one or more programmatic interfaces 977 in the depicted embodiment, enabling clients 910 to submit requests and messages related to training tasks of the kind discussed earlier and receive corresponding responses. Programmatic interfaces 977 may, for example, include web-based consoles, command-line tools, APIs, graphical user interfaces and the like in different embodiments.

A client 910 may submit a DataSetInfo message 902 in some embodiments to indicate one or more sources from which training data for machine learning models may be obtained, and, if needed, distributed among a collection of storage resources available. The MLS may store the provided information (e.g., storage device/node names, network addresses, credentials which may be used to access the storage devices/nodes, and so on) in a repository and send a DSInfoStored message 904 to the client in some embodiments.

In at least one embodiment, a client may provide information about a pool of compute resources which can be used on behalf of the client for machine learning tasks, e.g., in a ComputeResourcePool message 906. The information may indicate names, network addresses, and/or credentials which may be used to access the compute resources, determine the performance capabilities (e.g., processor types and speeds, memory sizes, etc.) of the resources, transmit DTCDs and/or training records to the resources, and so on in different embodiments. After the information about the compute resources has been saved at an MLS metadata repository, a CRPoolInfoStored message 908 may be sent to the client in the depicted embodiment.

A client 910 may provide batching preferences 911 to the MLS 999 via programmatic interfaces 977 in some embodiments, indicating for example the maximum amount of training data (or the maximum number of training records) which is to be processed at individual ones of the compute resources on behalf of the client. In some embodiments, this per-compute-resource training data size limit requested by the client may simplify the task of the MLS training parallelization coordinators (TPCs), as the TPCs may otherwise have to compute this limit based on analysis of the configurations of the compute resources. The client may also indicate other types of batching preferences—e.g., a limit on the resources or time available for batch training iterations may be indicated, which may be used at the MLS to terminate batching iterations before all the batches of training data have been processed if required. The preferences pertaining to batching may be stored at the MLS, and a BatchingPreferencesStored response message 912 may be sent to the client 910 in at least one embodiment.

An InitiateAutomatedDistributedTraining request 914 may be submitted by a client, resulting in the execution of the kinds of training iterations discussed earlier, e.g., in the context of FIG. 3 and FIG. 4. After the iterations have been completed, a TrainingCompleted message 918 may be sent to the client in some embodiments. Note that in at least some embodiments, automated training may be performed at the MLS even if information about the available compute resources (via messages similar to 906) and/or batching preferences (via messages similar to 911) has not been provided. For example, in such an embodiment, the MLS may utilize/allocate its own pool of compute resources, e.g., using a computing service of the provider network on behalf of the client. Similarly, in various embodiments, the decision as to whether batch iterations are needed or not may be made at the MLS without client input, and the particular batching parameters (batch sizes etc.) to be used if such iterations are needed may be determined at the MLS. Clients may not provide guidelines on how, for example, hyper-parameter values are to be mapped to DTCDs.

In some embodiments, after a particular round of automated training experiments has been conducted, e.g., in response to a message similar to 922, a client 910 may wish to initiate additional automated training experiments using variants of some of the DTCDs which have already been used. In such an embodiment, the client may submit an InitiateAdditionalTrainingWIthDTCDVariants request 922 via interfaces 977. In response, techniques such as random perturbation and/or DTCD element sub-group cross0-over may be employed to generate new variants of the DTCDs, and additional automated training iterations based on the new variants may be executed at the MLS. After the training with the variant DTCDs is completed, a DTCTDVariant-TrainingComplete message 924 may be sent to the client in some embodiments. In at least one embodiment, a client may not have to request such DTCD-variant based training; instead, if sufficient resources are available, the MLS may automatically execute such training without client input.

Clients may obtain values of various types of metrics pertaining to the automated training experiments conducted on their behalf by submitting ShowTrainingMetrics requests 926 in some embodiments. Metrics of at least two kinds may be provided to clients in response in the depicted embodiments: global metrics associated with the entire group of training experiments which were run using the DTCDs, and local metrics about the training operations performed at individual compute resources. Global metrics may indicate, for example, the number of trained models produced over a given time interval of M minutes or H hours using a given collection of compute resources, the average CPU/GPU utilization levels at the compute resources, the average memory utilization levels at the compute resources, the average or peak network bandwidth usage in the network being used for the training experiments, and so on. Local metrics may indicate, for example, CPU/GPU utilization levels at individual resources, per-model quality metrics such as precision, recall, F1 scores, AUC, and the like (which may depend on the particular training algorithm being used), and the like. One or more RequestedMetrics messages 928 may be sent to the client in the depicted embodiment, providing the requested types of metrics.

After the distributed training experiments are completed, one or more trained versions of the models may be stored at a repository of the MLS in some embodiments. In response to an ExecuteTrainedModel request 930 specifying a set of one or more data records for which predictions/inferences are to be obtained, the trained model(s) may be executed by the MLS, and the results obtained from the model(s) may be provided to the clients via one or more ModelOutput response messages 932 in the depicted embodiment. Other types of programmatic interactions, not shown in FIG. 9, may be supported by an analytics service 999 in different embodiments.

Use Cases

The techniques described above, of automating distributed training of machine learning models, without requiring clients to specify details regarding how training operations are to be run in parallel, may be useful in a variety of scenarios. Many sophisticated machine learning algorithms may require extensive tuning or experimentation to achieve optimal or near-optimal results, and each experiment may require the processing of large data sets. Furthermore, in order to be effective, machine learning models may have to be trained fairly quickly. The described combination of data parallelism (via batching) with model parallelism (accomplished by generating and distributing DTCDs) may enable the desired levels of model quality to be achieved within relatively short time periods for tasks such as similarity detection, deduplication, classification, and the like even, when hundreds or thousands of hyper-parameter combinations and feature combinations have to be tried out.

Illustrative Computer System

Figure 10:
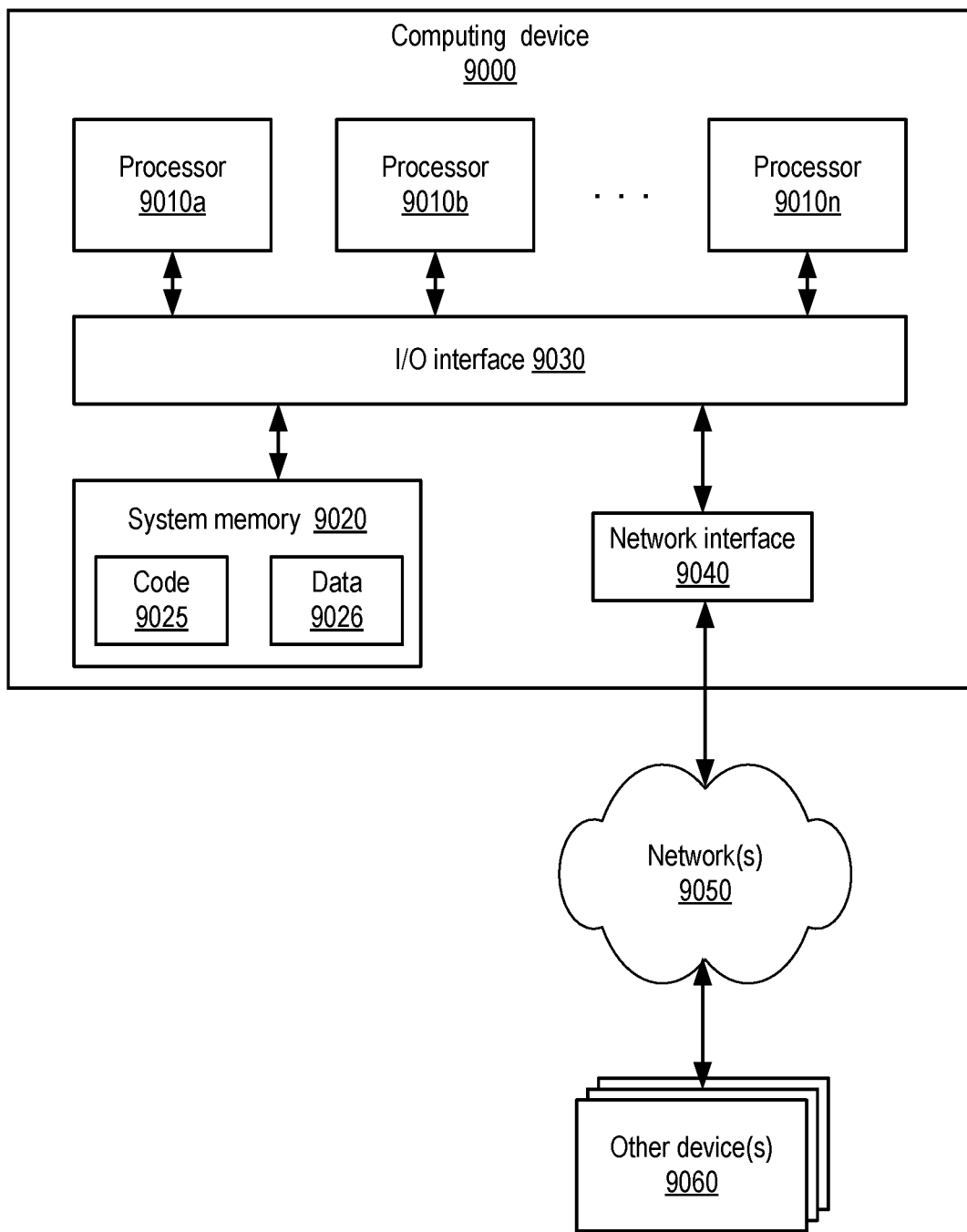
FIG. 10 is a block diagram illustrating an example computing device that may be used in at least some embodiments.

In at least some embodiments, a server that implements one or more of the techniques described herein, including for example components of machine learning services, parallel computing services used for distributed training, software container services used for distributed training, and the like, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and corresponding memory of one or more computing devices;
wherein the memory of one or more computing devices include instructions that upon execution on or across the one or more processors cause the one or more computing devices to:
identify a collection of compute resources for a machine learning training task comprising training, in parallel across the collection of compute resources, one or more machine learning models;
generate a plurality of control descriptors, including a first control descriptor and a second control descriptor, wherein individual control descriptors of the control descriptors indicate at least a training algorithm for training a model of the one or more models and values of one or more hyper-parameters of the training algorithm, wherein the first control descriptor indicates a different training algorithm or a different hyperparameter value than indicated by the second control descriptor;
assign respective unique descriptor identifiers to individual control descriptors of the plurality of control descriptors;
assign, to individual records of a plurality of records of a training data set of the machine learning training task, a respective batch identifier selected from a plurality of batch identifiers, wherein the batch identifier of a first subset of the plurality of records differs from the batch identifier of a second subset of the plurality of records;
generate a plurality of tuples, wherein individual tuples of the tuples indicate at least a respective record of the plurality of records of the training data set and a respective control descriptor of the plurality of control descriptors comprising the first and second control descriptors, wherein the number of tuples in the plurality of tuples is equal to the product of (a) the number of records of the training data set and (b) the number of control descriptors, indicating at least a training algorithm for training a model of the one or more models and values of one or more hyper-parameters of the training algorithm, of the plurality of control descriptors; and
cause a plurality of batch training iterations to be performed to train the one or more models, wherein a particular batch training iteration comprises:
identify a subset of the plurality of tuples whose records of the training data set were assigned a batch identifier corresponding to the batch training iteration;
distribute, using at least the descriptor identifiers indicated in the subset, the subset of tuples among the plurality of compute resources of the collection such that the number of distinct control descriptors; of the tuples distributed to an individual compute resource is no greater than a threshold; and in parallel at different compute resources of the plurality of compute resources and in accordance with corresponding training algorithms indicated by respective control descriptors of respective tuples of the distributed tuples a new version of the one or more machine learning models using the records in the distributed tuples as training data sets, wherein a first tuple of the distributed tuples indicates the first control descriptor and a second tuple of the distributed tuples indicates the second control descriptor indicating a different training algorithm or a different hyperparameter value than indicated by the first control descriptor, and wherein the first tuple and the second tuple indicate the same records assigned the batch identifier corresponding to the batch training iteration, such that a first compute resource to which the first tuple is distributed and a second compute resource to which the second tuple is distributed use the same records of the training data set for the training and use the different training algorithm or the different hyperparameter value for the training, during the batch training iteration, and wherein the training comprises modifying a previous version of the machine learning model which was trained in an earlier iteration; and provide, after a final batch training iteration of the plurality of batch training iterations has been completed, an indication of respective results obtained using trained versions of the one or more machine learning models for each of the first control descriptor and the second control descriptor in the final batch training iteration.

2. The system as recited in claim 1, wherein the first control descriptor indicates one or more data pre-processing operations, wherein the one or more computing devices include further instructions that upon execution on or across the one or more processors cause the one or more computing devices to:

implement, as part of the batch training iteration, prior to the training at the corresponding compute resource, the one or more data pre-processing operations on at least some records of the tuples distributed to the particular compute resource.

3. The system as recited in claim 1, wherein the one or more computing devices include further instructions that upon execution on or across the one or more processors cause the one or more computing devices to:

obtain, via a programmatic interface, a request to train at least one machine learning model, wherein the plurality of control descriptors is generated in response to the request, and wherein the request does not specify the set of hyper-parameter values to be included within individual ones of the control descriptors.

4. The system as recited in claim 1, wherein the training algorithm indicated in the first control descriptor differs from the training algorithm indicated in the second control descriptor.

5. The system as recited in claim 1, wherein the training algorithm indicated in the first control descriptor is one of: (a) a decision tree-based algorithm or (b) a neural network based algorithm.

6. A method, comprising:
performing, at one or more computing devices:
generating a plurality of control descriptors, including a first control descriptor and a second control descriptor, wherein individual control descriptors of the control descriptors indicate at least a machine learning training algorithm for training a machine learning model of one or more machine learning models and values of one or more hyper-parameters of the training algorithm, wherein the first control descriptor indicates a different training algorithm or a different hyperparameter value than indicated by the second control descriptor;

generating a plurality of tuples, wherein individual tuples of the tuples indicate at least a respective record of a plurality of records of a training data set and a respective control descriptor of the plurality of control descriptors comprising the first and second control descriptors, wherein the number of tuples in the plurality of tuples is based at least in part on the product of (a) the number of records of the training data set and (b) the number of control descriptors, indicating at least a training algorithm for training a machine learning model of the one or more machine learning models and values of one or more hyper-parameters of the training algorithm, of the plurality of control descriptors;

causing a plurality of batch training iterations to be performed to train the one or more machine learning models, wherein a particular batch training iteration comprises:
distributing at least some tuples of the plurality of tuples among a plurality of compute resources to train the one or more machine learning models, such that the number of distinct control descriptors of the tuples distributed to an individual compute resource is no greater than a threshold;

training, in parallel at different compute resources of the plurality of compute resources, at least one version of the one or more machine learning models in accordance with a training algorithm indicated by respective control descriptors of respective tuples distributed to the respective compute resources, wherein a first tuple of the distributed tuples indicates the first control descriptor and a second tuple of the distributed tuples indicates the second control descriptor indicating a different training algorithm or a different hyperparameter value than indicated by the first control descriptor, and wherein the first tuple and the second tuple indicate the same records of the plurality of records of the training data set, such that a first of the compute resources to which the first tuple is distributed and a second of the compute resources to which the second tuple is distributed to use the same records of the training data set for the training and use the different training algorithm or the different hyperparameter value for the training during the batch training iteration; and storing the trained versions of the one or more machine learning models.

7. The method as recited in claim 6, further comprising performing, at the one or more computing devices:
generating and storing a respective batch identifier associated with individual ones of the records of the training data set, wherein a plurality of records are associated with a particular batch identifier; and selecting, using the batch identifiers of the records indicated in the plurality of tuples, a subset of the plurality of tuples prior to distributing the tuples, wherein distributing the at least some tuples comprises distributing a subset corresponding to a particular batch identifier.

8. The method as recited in claim 6, wherein the first control descriptor indicates one or more data pre-processing operations, the method further comprising performing, at the respective compute resource, the one or more data pre-processing operations prior to the training.

9. The method as recited in claim 6, wherein the first control descriptor indicates one or more training metrics, the method further comprising:
   obtaining, at the respective compute resource, the one or more training metrics with respect to the training of the one or more machine learning models.

10. The method as recited in claim 6, further comprising performing, at the one or more computing devices:
   obtaining, via a programmatic interface, a request to train at least one machine learning model, wherein said generating the plurality of control descriptors is responsive to the request, and wherein the request does not specify hyper-parameter values for inclusion in individual ones of the control descriptors.

11. The method as recited in claim 6, further comprising performing, at the one or more computing devices:
   obtaining, via a programmatic interface, an indication of a range of values of a particular hyper-parameter for at least one machine learning training algorithm indicated in a particular control descriptor.

12. The method as recited in claim 6, wherein the machine learning training algorithm indicated in the first control descriptor differs from the machine learning training algorithm indicated in the second control descriptor.

13. The method as recited in claim 6, further comprising performing, at the one or more computing devices:
   obtaining respective memory sizes of individual ones of the plurality of compute resources; and
   determining the number of tuples to be distributed to a particular compute resource based at least in part on its memory size.

14. The method as recited in claim 6, further comprising performing, at the one or more computing devices:
   utilizing a random perturbation algorithm to select at least some elements to be included within a particular control descriptor.

15. The method as recited in claim 6, further comprising performing, at the one or more computing devices:
   based at least in part on analyzing training results obtained from individual ones of the compute resources, selecting a particular control descriptor as a source for generating one or more variant control descriptors;
   generating, from the particular control descriptor selected as the source, one or more variant control descriptors, wherein a particular variant control descriptor (a) differs from the source in at least one descriptor element and (b) comprises at least one descriptor element of the source; and
   causing one or more additional machine learning models to be trained in accordance with the particular variant descriptor.

16. One or more non-transitory computer-accessible storage media storing program instructions that when executed on or across one or more processors cause one or more computer systems to:
   generate a plurality of control descriptors, including a first control descriptor and a second control descriptor, wherein individual control descriptors of the control descriptors indicate at least an algorithm for training a model of one or more models and values of one or more hyper-parameters of the training algorithm, and wherein the first control descriptor indicates a different algorithm or a different hyperparameter value than indicated by the second control descriptor;
   generate a plurality of tuples, wherein individual tuples of the tuples indicate at least a respective record of a data set and a respective control descriptor of the control descriptors comprising the first and second control descriptors, wherein the number of tuples in the plurality of tuples is based at least in part on the product of (a) the number of records of the data set and (b) the number of control descriptors, indicating at least an algorithm for training a model of the one or more models and values of one or more hyper-parameters of the training algorithm, of the plurality of control descriptors;
   cause a plurality of batch training iterations to be performed to train the one or more machine learning models, wherein a particular batch training iteration comprises:
      distribute at least some tuples of the plurality of tuples among a plurality of compute resources to train the one or more machine learning models, such that the number of distinct control descriptors, indicating at least a training algorithm and values of one or more hyper-parameters of the training algorithm, of the tuples distributed to an individual compute resource is no greater than a threshold; and,
      train, in parallel at different compute resources of a plurality of compute resources, at least one version of the one or more machine learning models in accordance with training algorithms indicated by respective control descriptors of respective tuples of the distributed tuples and using the records in the distributed tuples as training data sets, wherein a first tuple of the distributed tuples indicates the first control descriptor and a second tuple of the distributed tuples indicates the second control descriptor indicating a different training algorithm or a different hyperparameter value than indicated by the first control descriptor, and wherein the first tuple and the second tuple indicate the same records such that a first compute resource to which the first tuple is distributed and a second compute resource to which the second tuple is distributed to use the same records of the training data set for the training and use the different training algorithm or the different hyperparameter value for the training, during the batch training iteration; and
      storing the trained versions of the one or more machine learning models.

17. The one or more non-transitory computer-accessible storage media as recited in claim 16, storing further program instructions that when executed on or across one or more processors further cause the one or more computer systems to:
   generate and storing a respective batch identifier associated with individual ones of the records of the data set, wherein a plurality of records are associated with a particular batch identifier; and
   select, using the batch identifiers of the records indicated in the plurality of tuples, a subset of the plurality of tuples prior to distributing the tuples, wherein said distribute at least some tuples comprises distribute a subset corresponding to a particular batch identifier.

18. The one or more non-transitory computer-accessible storage media as recited in claim 16, storing further program instructions that when executed on or across one or more processors further cause the one or more computer systems to:

indicate, in the first control descriptor, one or more data pre-processing operations to be performed at the particular compute resource prior to execution of the program.

19. The one or more non-transitory computer-accessible storage media as recited in claim 16, storing further program instructions that when executed on or across one or more processors further cause the one or more computer systems to:

obtain a request via a programmatic interface, wherein the plurality of control descriptors is generated in response to the request.

* * * * *